Dec. 30, 1952  I. L. WILCOX  2,623,680
CONTAINER AND METHOD OF MAKING SAME
Filed Sept. 4, 1948  2 SHEETS—SHEET 1

INVENTOR.
ISAAC L. WILCOX
BY Bodell E. Thompson
Attorneys

Dec. 30, 1952     I. L. WILCOX     2,623,680
CONTAINER AND METHOD OF MAKING SAME

Filed Sept. 4, 1948     2 SHEETS—SHEET 2

INVENTOR.
Isaac L. Wilcox
BY Bodell E. Thompson
Attorneys

Patented Dec. 30, 1952

2,623,680

UNITED STATES PATENT OFFICE 2,623,680

CONTAINER AND METHOD OF MAKING SAME

Isaac L. Wilcox, Fulton, N. Y., assignor to Oswego Falls Corporation, Fulton, N. Y., a corporation of New York Application September 4, 1948, Serial No. 47,923

3 Claims. (Cl. 229—4.5)

This invention relates to a container and the method of making the same. More particularly, it relates to a container formed of paperboard having a cylindrical or tubular body formation formed by winding a plurality of plies in a spiral tubular formation. The conventional method of making such containers is to wind two or more plies of paperboard on a conventional tube winding machine and during the winding operation to apply a permanent set adhesive between the plies.

This invention has as an object a container of the type referred to wherein the body portion of the container consists of inner and outer multiply layers, one of which is shifted axially relative to the other to provide end portions of reduced wall thickness.

The invention has as a further object a method for producing such a body member by shifting the layers subsequent to the winding operation and without cutting and removing any of the stock from either layer.

The invention has as a further object a container of the type referred to wherein the bottom or end closure consists only of a circular disk of paperboard inserted in the outer shifted layer and seated against the adjacent end of the inner layer, and being sealed thereto by the adhesive material employed to join the contiguous plies of the inner and outer layers, whereby the adjacent end of the inner layer is blocked off by the adhesive, thus preventing the raw edges of the plies of the inner layer from absorbing the liquid contents of the container. This application is a continuation in part of my application Serial No. 552,502, filed September 2, 1944, now abandoned.

The invention consists in the novel features and in the combinations and constructions and the method hereinafter set forth and claimed.

In describing this invention, reference is had to the accompanying drawings in which like characters designate corresponding parts in all the views.

Figure 1:
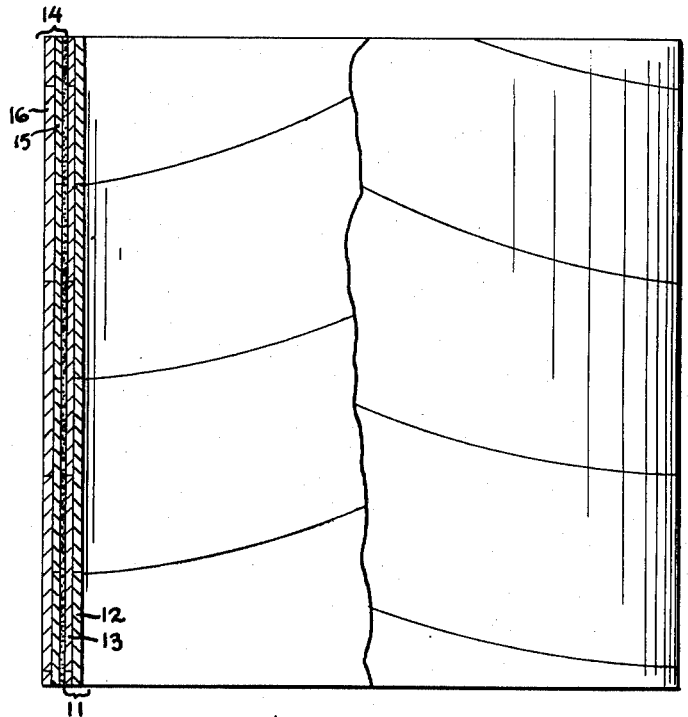
Figure 1 is a side elevational view of a tubular body section employed in the construction of the container of my invention, the tubular body section being shown partly in section.

Figure 1 illustrates the tubular body formation prior to the shifting of the inner and outer layers. This tubular formation is produced on a conventional tube winding machine having a stationary mandrel 10. The inner layer 11 consists of inner and outer plies 12, 13, and the outer layer 14 consists of plies 15, 16. In the winding operation, the ply 12 is fed next to the mandrel 10. The ply 13 is fed onto the ply 12 and adhered thereto by adhesive 18. The ply 15 is next fed onto the ply 13 and secured thereto by adhesive 20, and the outer ply 16 is fed upon the ply 15, all of the plies being continuously wrapped spirally about the mandrel by a driving belt 21, as will be well understood by those familiar with the tube winding art. The plies 12, 13, 15, and 16 are fed off from large rolls, whereby the winding operation is continuous, the tubular formation progressing outwardly from the free end of the mandrel and being cut into sections of desired length by a cutter 23 forming part of the tube winding machine.

The adhesive 18 between the plies 12, 13, and the adhesive 24 between the plies 15, 16, is of the type resistant to elevated temperatures. That is, its adhesive properties are not disturbed by a temperature rise considerably above room temperature.

The adhesive 20 however between the contiguous plies 13, 15, of the respective layers is of the non-penetrating type of hot melt adhesive. That is, the adhesive melts, or liquifies, and flows readily when subjected to a temperature above ordinary room temperatures but well below any temperature harmful to the adhesives 18, 24. There are certain hot melt adhesives which, when they liquify, are readily absorbed into paperboard, leaving substantially none of the adhesive on the surface of the board. Paraffin is an example of such adhesives.

The type of adhesive however that I employ between the plies 13, 15, melts and liquifies readily at relatively low temperatures, but remains upon the surface of the paperboard without any substantial absorption of the adhesive by the board. Examples of such type of adhesive are cellulose acetate butyrate, commercially known as Tenite #2, polyethylene, and polyvinyl acetate mixed with ester gum.

Figure 2:
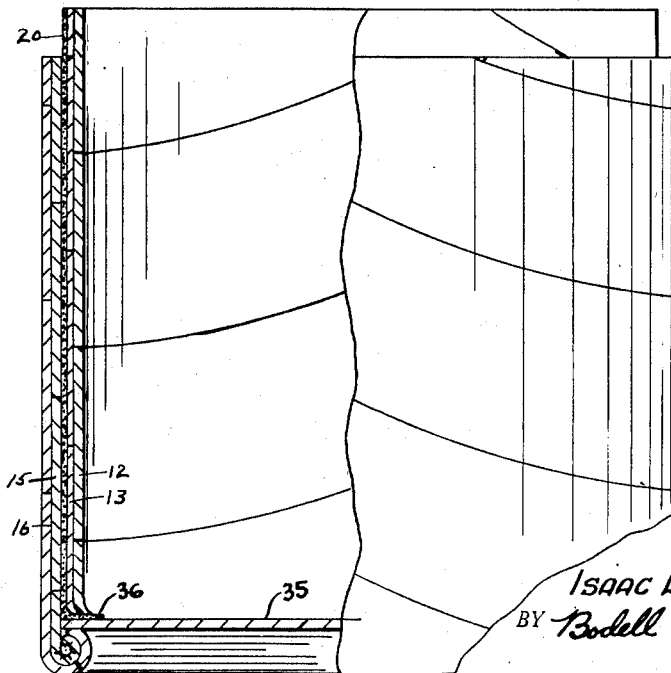
Figure 2 is a side elevational view of a container embodying my invention, with parts shown in section.
Figure 4:
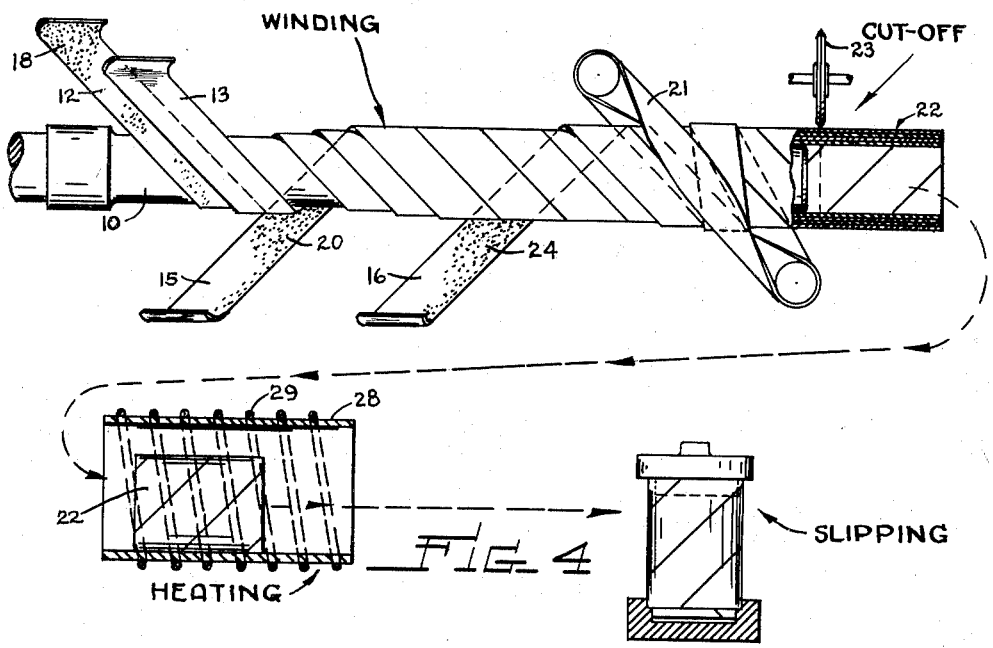
Figure 4 illustrates diagrammatically the equipment used in carrying out the method of making the container.
Figure 3:
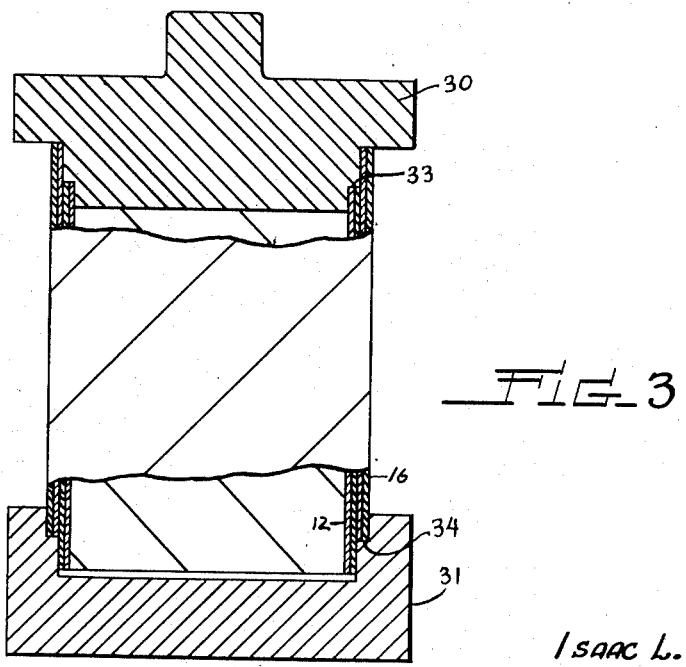
Figure 3 illustrates tools suitable for effecting shifting of the inner and outer layers of the structure shown in Figure 1.

The tubular sections 22 are subjected to the application of heat sufficient to liquify the adhesive 20 and while this adhesive is in liquid state, the inner and outer layers 11, 14, are shifted axially, as illustrated in Figures 2 and 3. The sections 22 may be conveniently heated by advancing them through a suitable oven, or heater 28 equipped with heating elements 29, the heated sections being advanced to suitable shifting tools as 30, 31, the tool 30 being formed with a shoulder 33 to engage the end of the inner layer 11, and the tool 31 with a similar shoulder 34 engaging the end of the outer layer 14. Relative axial movement between these tools while the adhesive 20 is in the liquid state, effects axial shifting of the layers.

A bottom end closure 35 is inserted within the outer shifted layer 14. This disk 35 is formed to have a relatively snug fit within the projecting end portion of the outer layer and is accordingly adapted to scrape off the adhesive 20 remaining on the inner surface of this outer layer, the insertion of the bottom taking place prior to the resetting of the adhesive. This accumulated adhesive, indicated at 36, Figure 2, serves to seal the bottom disk 35 to the end of the inner layer 11 and to effectively block off the end of the plies 12, 13, and thus prevent them from absorbing any liquid contents placed in the container. Thereupon, the projecting portion of the outer layer 14 is crimped, or spun, to form a bead 37 which securely locks the bottom disk 35 against the inner layer.

Due to the fact that the container body is formed of at least four plies of paperboard, these plies can be relatively thin and yet with the method described produces a container body more durable and rigid than the conventional two ply body having the same total thickness or weight of paper.

It will be observed that this container is produced with conventional equipment, it being only necessary to add the heater 28 intermediate the tube winding machine and the container making machine. The tools 30, 31, or the equivalent, can be added to one station of the container making machine, all whereby the container is made entirely automatic without any manual manipulation, and the resultant container is stronger and more durable than the conventional type of spiral wound can.

What I claim is:

1. A container comprising a tubular body formed of inner and outer multi-ply cylindrical layers of paperboard, said layers being of equal length, said layers being axially displaced to produce extended end portions of reduced thickness, one of said portions consisting of the outer layer only, the contiguous plies of said layers being joined together with a non-penetrating hot melt adhesive, said contiguous plies being joined to the other plies of said layers by a heat resistant adhesive, an end closure disk inserted in the extended end portion of said outer layer, and seated against the adjacent end edge of said inner layer and being sealed thereto by said hot melt adhesive.

2. The method of making a container, the improvement consisting in simultaneously winding inner and outer multi-ply layers of paperboard, securing the contiguous plies of said layers together with a non-penetrating hot melt adhesive, securing the contiguous plies of said layers respectively with a heat resistant adhesive to form a tubular formation, cutting said formation into container body sections, heating said severed sections to render said hot melt adhesive liquid, shifting one of said layers axially of the other while said adhesive is liquid, inserting a closure disk into the extended end portion of the outer layer while said adhesive is liquid, and seating the disk against the adjacent end of the inner layer and crimping said end portion of said outer layer against said disk.

3. A container comprising a tubular body formed of inner and outer multi-ply cylindrical layers of paperboard, said layers being of equal length, said layers being axially displaced to produce extended end portions of reduced thickness, one of said portions consisting of the outer layer only, the contiguous plies of said layers being joined together with a non-penetrating hot melt adhesive, said contiguous plies being joined to the other plies of said layers by a heat resistant adhesive, an end closure disk inserted in the extended end portion of said outer layer and seated against the adjacent end edge of said inner layer and being sealed thereto by said hot melt adhesive, and said extended end portion of said outer layer being crimped inwardly against the disk.

ISAAC L. WILCOX.

REFERENCES CITED

The following references are of record in the file of this patent:

UNITED STATES PATENTS

| Number | Name | Date |
|---|---|---|
| 576,980 | Grimm | Feb. 9, 1897 |
| 1,106,005 | Shevlin | Aug. 4, 1914 |
| 1,390,644 | Ritchie | Sept. 13, 1921 |
| 2,314,338 | Graves | Mar. 23, 1943 |
| 2,320,764 | Ullrich | June 1, 1943 |
| 2,337,656 | Haycock | Dec. 28, 1943 |
| 2,415,625 | Coker | Feb. 11, 1947 |
| 2,461,539 | Fletcher | Feb. 15, 1949 |

FOREIGN PATENTS

| Number | Country | Date |
|---|---|---|
| 492,163 | Great Britain | Sept. 15, 1938 |

OTHER REFERENCES

"The Technology of Adhesives," by John Delmonte, Reinhold Publishing Corp., 1947, pages 134, 165 and 166.